United States Patent

[11] 3,617,845

[72] Inventor William F. McKenna
Rockford, Ill.
[21] Appl. No. 32,269
[22] Filed Apr. 27, 1970
[45] Patented Nov. 2, 1971
[73] Assignee Applied Motors, Inc.
Rockford, Ill.

[54] ENERGY-CONSERVING CONTROL CIRCUIT USING POWER TRANSISTORS
16 Claims, 11 Drawing Figs.
[52] U.S. Cl............................................. 318/341, 318/331
[51] Int. Cl............................................. H02p 5/16
[50] Field of Search................................. 318/331, 332, 341, 345

[56] References Cited
UNITED STATES PATENTS
3,358,206 12/1967 Thiele .................... 318/341
3,517,291 6/1970 Carruth .................. 318/341

Primary Examiner—Benjamin Dobeck
Assistant Examiner—Thomas Langer
Attorney—Wolfe, Hubbard, Leydig, Voit & Osann ABSTRACT: A control circuit for supplying pulses of current, with a variable duty cycle, from a voltage source through a load which may vary in its effective impedance and wherein a power transistor is in series with the load to turn the current on and off. The transistor is driven always to collector current saturation when it is turned on so that power loss in the transistor and excessive heating are substantially minimized. But when the effective load impedance is high, the base-emitter current required to saturate the transistor is considerably less than that required when the effective load impedance is low. To avoid energy dissipation and loss due to unnecessarily high emitter-base current, the base-emitter circuit includes a control transistor which acts as a controllable impedance, the control transistor receiving emitter-base current proportional to the voltage drop across the power transistor so that emitter-base current of the power transistor is always just sufficiently great to keep the power transistor saturated. The average current through the load, e.g., a DC motor, is varied by employing a multivibrator adjustable in its duty cycle to produce a control signal which alternately enables or disables the control transistor. And to avoid energy loss due to slow turnoff of the power transistor, the emitter-base junction of the power transistor is shunted by a transistor automatically switched to its conductive, low-impedance state or its nonconductive, high-impedance state by a signal from the multivibrator when the power transistor is turned on or off. These energy-conserving features are of particular benefit in applications such as speed control of a DC motor in golf carts, fork lift trucks and the like where the voltage source is a battery and maximum usage between recharges is important.

INVENTOR.
WILLIAM F. MCKENNA,
BY
Wolfe, Hubbard, Leydig, Voit & Osann
ATTORNEYS.

ENERGY-CONSERVING CONTROL CIRCUIT USING POWER TRANSISTORS

BACKGROUND OF THE INVENTION

The present invention relates in general to apparatus for supplying a variably controlled current to an electrical load, and in particular to such apparatus for supplying current from a voltage source to a load which varies in its effective impedance. Although the invention will find a wide variety of advantageous applications, it is particularly useful in controlling the energization of a DC motor from a battery while achieving very low power loss in and heating of the final power and speed controlling transistor.

It is the general aim of the invention to provide for the controlled energization of an electrical load, which may vary in its effective resistance or impedance, from a voltage source by controlling the conduction of current through a power transistor to the load, —and in a manner such that energy losses in and possibly harmful heating of the transistor are kept very low.

In a related and more specific sense, it is an object of the invention to provide for the controlled energization of a DC motor from an electrical energy storage device such as a rechargeable battery, and to obtain considerably more useful work by the motor between recharges of the battery.

Another object of the invention is to minimize energy losses in a power transistor connected to control the current supplied from a voltage source through a load which varies in its effective impedance or resistance, by means which cause the transistor to operate in a saturated condition of collector-emitter conduction, but wherein the controlling base-emitter current supplied to the transistor is automatically varied to be just sufficient to maintain collector current saturation whenever the transistor is turned on. This eliminates the considerable power drain which otherwise would exist if the controlling base-emitter current were maintained at the high level required to produce collector current saturation when the load impedance has its lowest value.

Still another object is to provide the advantageous means described above while nevertheless controlling the effective average voltage and current applied to the load device by turning the transistor alternately full on or full off with an adjustable duty cycle.

A further object is to provide for quick cut off of a transistor when it is driven alternately between current saturation and nonconduction —so that intervals of operation in a nonsaturated mode are shortened to further reduce energy dissipation in and heating of the transistor. In a battery-powered system for controlling the speed of a motor pulsed with a variable duty cycle, this further increases the amount of work which can be obtained from the motor before the battery requires recharging.

SUMMARY OF THE INVENTION

In its preferred form, the invention comprises a power transistor for controlling pulses of voltage and current from a battery to a variable impedance load, the transistor being turned on and off with an adjustable duty cycle established by a recurring square wave control signal. When the signal is "off," a controllable impedance in series with the base-emitter junction of the transistor is, in effect, rendered infinite, so the transistor is turned off. When the signal is "on," the controllable impedance is given a finite value to draw base-emitter current and drive the transistor to collector current saturation. As the load impedance varies, however, and potential drop across the collector-emitter path of the transistor changes, such potential drop variations are utilized to cause inverse changes in the value of the controllable impedance, so that base-emitter current increases or decreases to just maintain collector current saturation, and without useless, excessive base-emitter current. In addition, the control signal is applied to a second controllable impedance connected across the base-emitter path of the transistor to make that impedance high or low when the signal is "on" or "off" respectively. Thus, stored charge carriers are discharged quickly from the base-emitter path of the transistor when the latter is to be turned off, —further reducing energy dissipation in the transistor.

BRIEF DESCRIPTION OF THE DRAWINGS

Exemplary embodiments of the invention are illustrated by the accompanying drawings, in which.

While the invention has been shown and will be described in some detail with reference to particular embodiments thereof, there is no intention that it thus be limited to such detail. On the contrary, it is intended here to cover all modifications, alternatives and equivalents falling within the spirit and scope of the invention as defined by the appended claims.

DESCRIPTION OF THE PREFERRED EMBODIMENT

Figure 1:
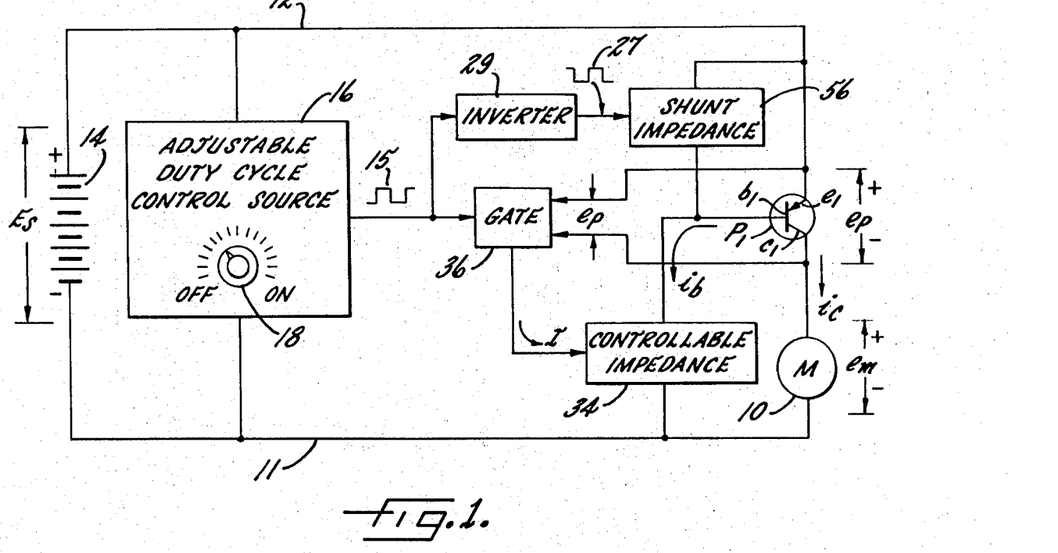
FIG. 1 is a block diagram of a control system for controlling the speed of a motor energized from a battery with adjustable duty cycle pulses.

Referring now to FIG. 1, a motor 10 is connected by main supply buses 11 and 12 in series with a power transistor P1 across a suitable voltage source here illustrated as a storage battery 14 providing a source voltage $E_s$. For purposes of discussion but not in a limiting sense, it may be assumed that the motor 10 is utilized in an electrically driven vehicle such as a golf cart or fork lift truck, and that the battery 14 is rechargeable after a predetermined amount of energy has been drawn therefrom in the operation of the vehicle.

In such applications, it is desirable that high starting or breakaway torque be produced by the motor 10, so that relatively high currents must be supplied during starting. It is also important that the motor 10 convert as much as possible of the energy stored in the battery after each recharging into useful physical work, and that the control circuits dissipate or waste a minimum of that energy, so that the golf cart, fork lift truck or other vehicle can be used for long times and travel over relatively long distances between successive recharges of the battery. Moreover, the motor 10 must be controlled in its speed so that the velocity of the vehicle can be varied by the driver smoothly from a slow to a high, maximum value.

Figure 3:
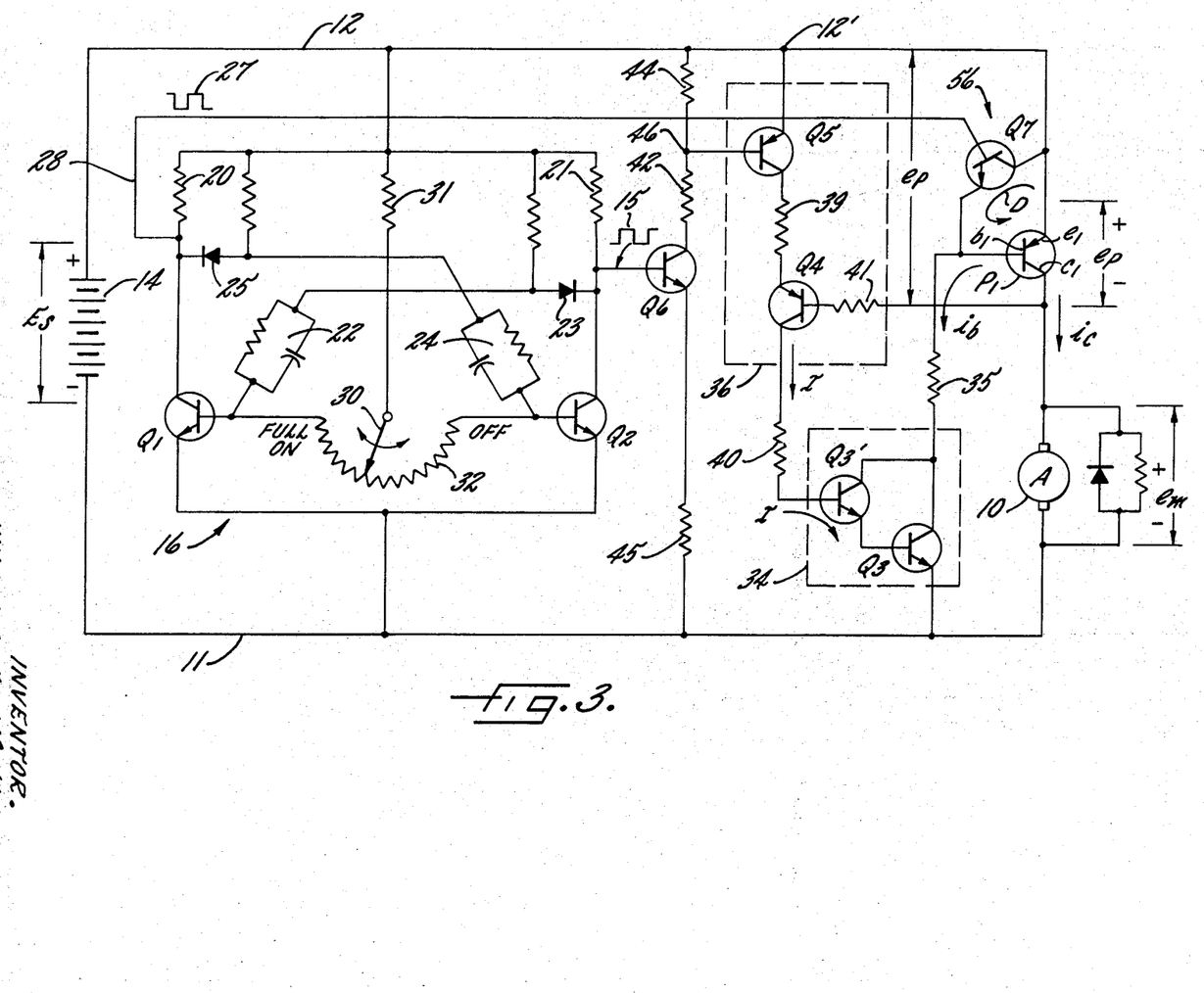
FIG. 3 is a schematic diagram of a control circuit embodying the features of the invention and showing in more detailed form the apparatus of FIG. 1.

These objectives are achieved by the control apparatus shown generally in FIG. 1 and with greater detail in FIG. 3. Before the control apparatus is described, however, it will be helpful to consider the characteristics of the principal elements, i.e., the motor 10 and the power transistor P1.

The motor 10 may be a DC motor having either a permanent magnet field or a shunt field excited by a second circuit (not shown). The field-producing structure may be disposed on either the stator or the rotor, but it cooperates with windings on an armature A which receive energizing current passed through the transistor P1 from the battery 14.

The motor armature is an electrical load which varies in its effective impedance, i.e., the opposition which it presents to current flow, because the back EMF in the armature varies according to the motor speed. To pick exaggerated examples for purposes of explanation, if the motor 10 were connected directly across a 24 volt battery and its speed and back EMF are both initially zero, a high starting current of 120 amperes might flow, —indicating an effective impedance of 0.20 ohms. Then, as the motor builds up speed the armature back EMF will increase. At 500 r.p.m. the back EMF might be, for example, 16 volts, and the armature current 40 amperes; and at 2,000 r.p.m. the back EMF might be 23 volts and the armature current 5 amperes. In these latter two examples, the armature current when considered in relation to the source voltage $E_s$ of 24 volts makes the motor appear as if it has an effective impedance or resistance of 0.60 ohms of 4.8 ohms, respectively. Thus, the effective impedance of the motor as an electrical load varies widely as a function of motor speed. The speed is determined by the reaction torque load imposed on the motor and the effective or average voltage applied to the armature. It will be apparent to those skilled in the art that various other types of electrical load devices may exhibit a varying or changing effective impedance or resistance under different conditions, and the motor 10 here shown is merely typical of an electrical load which is variable in its effective impedance.

The power transistor P1 has an emitter $e1$, base $b1$ and collector $c1$, with its emitter-collector path connected in series with the battery 14 and the motor 10. To obtain sufficient total current-carrying capacity in actual practice, several such transistors may be connected in parallel, and the single transistor P1 here shown should be considered to represent one or more parallel transistors. The transistor P1 exhibits the known characteristic that current flow $i_c$ through its emitter-collector path for a given value of the series load impedance is substantially zero when the emitter-base path current $i_b$ is zero; but as $i_b$ increases, $i_c$ increases up to the point of saturation at which further increases in $i_b$ produce no further increases in $i_c$. If the load impedance is low, the saturation values of $i_c$ and $i_b$ are large; conversely, if the load impedance is high, the saturation values are small. In effect, the condition of collector-current saturation begins when the voltage drop $e_p$ across the emitter-collector terminals of the transistor has been reduced to some predetermined low value (e.g., about 0.3 volts). If the load impedance is low or high, then a higher or lower value of base current $i_b$ is required to produce collector-current saturation. On the other hand, if the base current $i_b$ is sufficiently large to saturate the transistor when the load impedance has a given value, further increases in the base current $i_b$ will not result in appreciable changes in the collector current $i_c$ and will cause only a relative small decrease in the voltage drop $e_p$.

The power dissipated in the transistor P1, and lost in the form of heat which undesirably raises the transistor temperature, is represented as watts equal to the product of the emitter-collector voltage drop $e_p$ times the current $i_c$. To keep this power dissipation low, the transistor is desirably operated always either in the full off or full on (saturated) mode, so that when collector-current does flow, the emitter-collector voltage drop is nearly a minimum.

The manner in which the transistor P1 is operated so as to be either cut off or saturated, and yet in which the speed of the motor 10 may be controlled, will be explained below. But from what has been said above, it will be understood that when the transistor is turned on and saturated, the amount of current which flows through the transistor P1 and the motor 10 will be determined almost solely by the value of the load or motor impedance. If it is assumed that the current gain $i_c/i_b$ of the transistor is 60 and the battery voltage $E_s$ is 24 volts, then to produce saturation of the transistor when the load impedance is very small (motor speed zero) and draws 120 amperes, 2 amperes of enabling base current $i_b$ must be passed through the emitter-base path. Thus, to produce the desired maximum current when the effective motor impedance is at a minimum, 2 amperes of emitter-base current will be drawn from the battery 14, imposing a drain of 48 watts. Such 2 amperes of base current would normally be provided by a biasing voltage divider, and would be supplied through the emitter-base path continuously even though the load impedance increases and the collector current $i_c$ decreases. For extended periods of time, the 48 watts consumed by the base current $i_b$ materially detracts from the total amount of energy available in the fully charged battery 14, and thus lessens the amount of energy available for conversion into useful work by the motor 10.

On the other hand, if the motor 10 is operated, as it will be, at half or even full speed most of the time, and at full speed it draws only 5 amperes of collector current $i_c$ because its effective impedance is high, then the transistor P1 may be operated in a saturated mode (with nearly a minimum emitter-collector voltage drop) if only 0.83 amperes of base current are passed through the emitter-base path. If the base current is reduced to this latter value instead of being maintained at the required motor-starting value of 2.0 amperes, then only 20 watts of power will be taken from the battery 14 to create the required enabling base current $i_b$. Thus, the power consumed by base current flow at high motor speeds, and when the load impedance is effectively high, may be reduced from 48 watts to 20 watts, representing a saving on the order of 58 percent. In other words, with the numerical values assumed above for purposes of explanation, and if the base current $i_b$ supplied to the power transistor P1 is adjusted to always be just sufficient to maintain current saturation as the load impedance increases in value, then a considerable reduction in useless power drain from the battery may be obtained, and more energy can be taken from the battery after each recharging for useful work in the motor 10.

As a part of the present invention, I have recognized that the base current supplied to a power transistor in series with a variable impedance load represents a considerable drain of energy from the voltage and current source. Further, I have recognized that if the base current is kept at the same value required to saturate the transistor when a high load current is required and the load impedance is low, then as the load impedance increases the base current energy dissipation is simply partly unnecessary and wasted. Not only does this shorten the time and the amount of work which may be accomplished by the motor between recharges of a storage battery; it also produces heating within the transistor which may cause sufficiently high temperatures to damage the latter unless an extremely big heat sink is employed.

Figure 2:
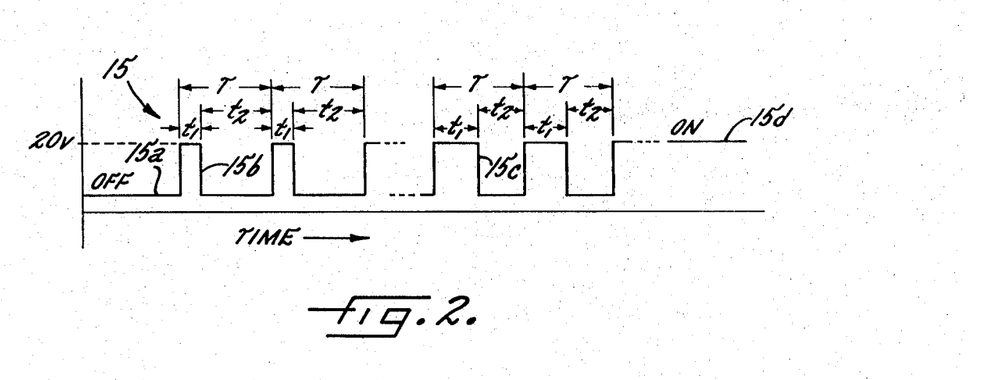
FIG. 2 is a waveform diagram showing the control signal produced by the adjustable source shown in FIG. 1.

With the foregoing in mind, the invention as embodied in FIGS. 1 and 3 may now be better understood. In order to vary and control the speed of the motor 10, the power transistor P1 is cycled off and on between cutoff and current saturation modes with a variable duty cycle so as to adjust and control the average value of the voltage pulses applied to the motor 10. For this purpose, the emitter-base current $i_b$ for the transistor P1 is turned off and on in response to a square wave control signal which is adjustable in its duty cycle. As here shown in FIG. 1, the control signal 15 is produced by an adjustable duty cycle control source 16 having a control knob 18 movable to various positions between "off" and "full." As shown in FIG. 2, the control signal 15 will continuously have a low or off value $15a$ if the knob 18 is set to its left limit position. But as the knob is turned progressively to the right, the recurring square wave control signal appears with alternate off and on values during time intervals $t_1$ and $t_2$ making up a total period T. As shown at $15b$ in FIG. 2, the duty cycle or ratio $t_1/t_2$ of the on and off time intervals is fairly low since the interval $t_1$ is much shorter than the interval $t_2$. If the knob 18 is turned further to the right, then the square wave control voltage 15 is modified to have the form shown at $15c$ in FIG. 2 where the duty cycle ratio $t_1/t_2$ is much greater. Finally, if the knob is turned to its right limit, the control signal 15 remains steadily at its "on" value. The frequency and period T of the control signal 15 may remain constant as the duty cycle is varied, but acceptable operation is obtained if the frequency changes.

The control signal source 16 may take a variety of specific forms, that shown in FIG. 3 being a free-running multivibrator of the type known per se to those skilled in the art. Briefly stated, the multivibrator comprises NPN transistors Q1 and Q2 having their collector-emitter paths connected in series through load resistors 20 and 21 across the voltage supply buses 11 and 12. The base of Q1 is cross coupled to the collector of Q2 through an RC timing circuit 22 and a diode 23; while the base of Q2 is connected through an identical RC timing circuit 24 and a diode 25 to the collector of Q1. In consequence, the transistors Q1 and Q2 are alternately and complementally conductive and cut off, thereby producing the recurring square wave control voltage 15 at the collector of Q2 and which during alternate periods $t_1$ and $t_2$ is at a high or "on" potential (when Q2 is cut off) and at a low or "off" potential (when Q2 is conductive) measured relative to the bus 11. A similar square wave signal 27 appears on a conductor 28 connected to the collector of transistor Q1, this latter signal being the complement of the control signal 15 and equivalent to that which would be produced by passing the control signal 15 through an inverter. Thus, in FIG. 3 the complement control signal 27 is shown as appearing on the line 28 connected to the collector of transistor Q1 in the free-running multivibrator, whereas FIG. 1 shows the complement control signal 27 being the output of an inverter 29 connected to receive as its input the control signal 15.

The frequency and the period T of the control signal 15, and also the duty cycle, are determined by the time constants of the two RC circuits 22 and 24 and the setting of a wiper 30 connected to the bus 12 through a resistor 31 and movable along a potentiometer 32 connected between the bases of the transistors Q1 and Q2. This setting establishes the voltage spans which must be traversed by charging of the capacitors in the RC circuits 22 and 24 to switch the multivibrator from one state to the other. When the wiper 30 is at its clockwise limit (FIG. 3) the transistors Q1 and Q2 are respectively conductive and cut off, so that the control signal 15 has its "on" or high value. When the wiper 30 is at its counterclockwise limit, the transistors Q1 and Q2 are respectively cut off and conductive, so that the control signal voltage 15 has its "off" or low value. When the wiper 30 is adjusted to positions intermediate its two limits, the multivibrator oscillates with a frequency which may vary from about 25 c.p.s. to 1,000 c.p.s., but with an adjustable duty cycle or ratio of the time intervals $t_1$ and $t_2$, as explained above. The manner in which the variable duty control cycle is utilized will be explained hereinafter.

In accordance with the present invention, a controllable impedance 34 (FIG. 1) is connected in series across the source voltage $E_s$ with the emitter-base path of the power transistor P1, thereby affording a path for the flow of base current $i_b$ so that the transistor P1 may be rendered conductive and pass energizing current $i_c$ through the motor 10. As shown in FIG. 3, the controllable impedance 34 preferably takes the form of a control transistor Q3 having its collector-emitter path included in the series circuit leading from the positive bus 12 through the emitter-base path of transistor P1 and a resistor 35 to the negative bus 11. Although a single transistor Q3 may suffice, it is here shown associated with a second transistor Q3' coupled to form a Darlington pair which functions as a single transistor operative with a smaller range of input base current values.

The "impedance" or resistance of the collector-emitter path in the transistor Q3 depends upon and is generally proportional to the control current I passed through the base-emitter path of that transistor. Accordingly, it may be said that the transistor Q3 constitutes a "controllable impedance." It will be apparent that the base current $i_b$ for the power transistor P1 varies inversely with changes in the value of the controllable impedance and thus directly according to changes in the control current I.

In keeping with one aspect of the invention, means are provided to vary the controllable impedance 34 in the same sense as and according to changes in the value of the load impedance, such means being effective whenever the power transistor P1 is turned on and supplying current to the load here represented by the motor 10. The latter means are illustrated in FIG. 1 as a gate 36 receiving and enabled or disabled by the control signal 15 when the latter is respectively "on" or "off." Assuming for the moment that the control signal 15 is steadily "on" and thus that the gate 36 is enabled, the gate receives as an input the voltage drop (here labeled $e_p$) appearing across the emitter-collector path of the power transistor P1, and functions to produce an output current I which in general varies directly according to changes in such voltage drop. This results in the controllable impedance 34 changing in value in accordance with any changes in the emitter-collector voltage $e_p$, so that the base current $i_b$ increases or decreases in response to increases or decreases in the voltage $e_p$.

If one assumes for the moment that the speed of the motor 10 is zero or has a low value, and that the effective armature impedance is thus low, a relatively large collector current $i_c$ will flow. If the controllable impedance 34 presented by the transistor Q3 is so large that transistor P1 is not saturated, the voltage drop $e_p$ will be relatively great (e.g., in excess of 0.3 volts). In these circumstances, the gate 36 will increase the control current I, in turn reducing the impedance presented by the transistor Q3, and thus increasing the base current $i_b$, until the transistor P1 is saturated and the voltage drop $e_p$ is reduced to a predetermined low value of about 0.3 volts. Under these circumstances the transistor is operating substantially in a saturated but not oversaturated mode, i.e., a further increase in the base current will produce only a small increase in the collector current $i_c$.

On the other hand, if the transistor P1 is substantially in a saturated state when the load impedance presented by the motor is low, so that the voltage drop $e_p$ is about 0.3 volts; then if the motor speed and its effective impedance increase, the collector-current $i_c$ will decrease and the voltage drop $e_p$ will tend to decrease very slightly if the base current $i_b$ remains constant. But when the voltage drop $e_p$ tends to decrease slightly below 0.3 volts, the gate 36 causes the control current I to decrease. As a result, the current $i_b$ is decreased until the voltage drop $e_p$ is restored to about 0.3 volts and the transistor P1 is operating in a substantially saturated but not oversaturated mode.

The gate 36 is shown in more detail by FIG. 3 as comprising a transistor Q4 associated with (a) means for connecting its emitter-base path in parallel across the emitter-collector path of the power transistor P1 and (b) means for connecting its emitter-collector path in series with the base-emitter path of the control transistor Q3 across the voltage source constituted by the battery 14. In the present instance, the gate includes a switching transistor Q5, and it may be seen from FIG. 3 that a series circuit is established from point 12' on the bus 12 through the emitter-collector path of Q5, a resistor 39, the emitter-collector path of Q4, a resistor 40, and the base-emitter paths of the transistors Q3' and Q3 to the conductor 11. Assuming that the transistor Q5 is fully turned on and conductive, it may be viewed as a closed switch presenting negligible resistance. Thus, current may flow from the point 12' to the emitter of the transistor Q4. The base of this latter transistor is connected through a resistor 41 to the collector of the transistor P1. Accordingly, the voltage applied across the emitter-base junction of the transistor Q4 is substantially equal or proportional to the emitter-collector voltage drop $e_p$ across the transistor P1. Therefore, the emitter-base current which flows in transistor Q4, and which determines the effective impedance or resistance in the emitter-collector path of the latter, is responsive and proportional to the voltage drop $e_p$. In consequence, the control current I which passes through the transistor Q4 varies directly according to changes in the value of the voltage drop $e_p$ appearing across the transistor P1.

When the impedance of the load represented by the motor 10 increases or decreases so that the voltage drop $e_p$ tends slightly to decrease or increase, the control current I decreases or increases so as to decrease or increase the impedance of the transistor Q3, thereby increasing or decreasing the base current $i_b$ to maintain the transistor P1 in a substantially saturated but not oversaturated mode. This means that a relatively large base current $i_b$ may be drawn through the transistor P1 when the effective impedance of the motor 10 is low, so that a starting current having a high average value may be supplied to the motor. But as the motor speed progressively increases so that its back EMF and effective impedance progressively increase, and thus the collector current $i_c$ tends to decrease, the base current $i_b$ for the transistor P1 is progressively reduced to a much lower value by the time the effective motor impedance has increased to its full speed value and the collector current $i_c$ is relatively small.

From the foregoing, it will be seen that the power transistor P1 is supplied with sufficient base current when the effective impedance of the motor 10 is low to supply the necessary large motor starting current while keeping the transistor P1 substantially saturated. But on the other hand, as the effective impedance of the motor 10 thereafter increases, the base current $i_b$ through the transistor P1 need not be as large in order to keep the transistor substantially in a state of saturated conduction, and this base current is automatically reduced so as to just keep the transistor saturated, thereby reducing the rate of energy drain imposed on the battery 14 in order to supply the base current $i_b$.

From the example given above, when the motor 10 requires 120 amperes for starting current and its effective impedance is low, the base current $i_b$ may be on the order of 2 amperes if the current gain of the transistor P1 is assumed to be 60. Then, by the time the motor has reached full speed and its back EMF and effective impedance have increased so that the motor draws only about 5 amperes, the base current will be reduced to approximately, 0.83 amperes. In the former case, the power drain on the battery 14 to supply the required 2 amperes of base current is 48 watts, assuming that the battery voltage $E_s$ is 24 volts. But in the latter case (which will obtain during most of the time that the motor 10 is in operation), the power drain on the battery 14 due to base current will be only about 20 watts. Thus a considerable energy saving is effected by the control apparatus which reduces the base current $i_b$ in response to increases in effective load impedance while nevertheless maintaining the power transistor P1 in a substantially saturated state. It will be seen that this result is obtained by means here shown as the transistor Q4 responsive to the emitter-collector voltage drop $e_p$ across the transistor P1, such means acting to reduce or increase the variable impedance (formed by the transistor Q3) connected in the circuit for the emitter-base path of the transistor P1.

As mentioned above, the gate 36 includes a switching device constituted by the transistor Q5 and which (as shown in FIG. 3) has its base connected to respond to the control voltage 15. In greater detail, the control 15 appearing at the collector of transistor Q2 is connected to the base of an inverting transistor Q6 which has its collector connected through resistors 42 and 44 to the positive bus 12 and its emitter connected through a resistor 45 to the negative bus 11. Thus, as the control signal 15 takes on its relatively high or low values (here called "on" and "off" values), base-emitter current is supplied or terminated through the transistor Q6 and the collector-emitter path of the latter is rendered conductive or nonconductive. Therefore, the potential at the junction 46 between the resistors 44 and 42 takes on a relatively low or high value as the control signal 15 has its "on" and "off" values. Whenever the control signal has its "on" value, the potential at point 46 is sufficiently low to permit emitter-base current to flow in the transistor Q5, thereby rendering the emitter-collector path of the latter fully conductive. In this way, the transistor Q5 is turned respectively on or off when the control signal 15 has on or off values. When the transistor Q5 is conductive, the transistor Q4 functions as described above to control the current I in response to changes in the voltage drop $e_p$. On the other hand, when the transistor Q5 is nonconductive, no current can flow through its emitter-collector path, and none can flow through either the emitter-base path or the emitter-collector path of the transistor Q4. Therefore, when the control signal 15 is "off," the control current I is zero, and the transistor Q3 is substantially cut off to present a very high impedance. Thus, essentially no base current $i_b$ can flow through the power transistor P1 and the latter is completely cut off.

From the foregoing, it will be apparent that the transistor P1 is alternately rendered fully cut off or fully conductive in a saturated state when the control signal 15 has its "on" or "off" values. Thus, timed pulses of voltage and current are applied to the armature of the motor 10 at a frequency which is changeable over a range of about 25 to 1,000 c.p.s., but the duty cycle of the on and off periods is adjustable as explained previously. By varying that duty cycle, the average value of the voltage and current applied to the motor 10 can be changed over a relatively wide range, and it is the average value of the voltage applied to the motor 10 which determines the speed at which it operates for a given mechanical load. If the potentiometer wiper 30 is moved to its full off position, the motor 10 is completely deenergized and turned off. As the wiper 30 is progressively moved in a clockwise direction (FIG. 3) the voltage and current applied to the motor have a progressively increased average value, and thus the motor operates at a progressively higher speed. When the wiper 30 reaches its full position, the control signal 15 remains steadily at its "on" value, so that the motor 10 is no longer pulsed and is steadily connected through the transistor P1 to the battery 14. Accordingly, the motor 10 runs with its maximum speed.

The control apparatus of FIGS. 1 and 3 thus enables a variable impedance load such as the motor 10 to be energized with a controllable average current by adjustment of the duty cycle with which the power transistor P1 is turned fully off and fully on. Whenever the transistor P1 is conductive, even for short time intervals, it operates in a substantially saturated state so as to minimize power losses therein and to avoid detrimentally high temperatures due to heat dissipation. Moreover, whenever power transistor P1 is conducting in a saturated state, the base current $i_b$ is automatically kept just sufficiently great to make the transistor saturated so that no more power than is necessary is drawn from the battery 14 and consumed in order to keep the transistor saturated.

Figure 5A:
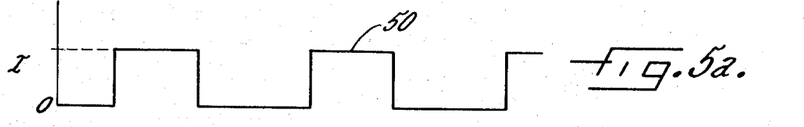
FIGS. 5a through 5g are graphic waveforms showing in an exaggerated manner how certain currents vary with time.
Figure 5B:
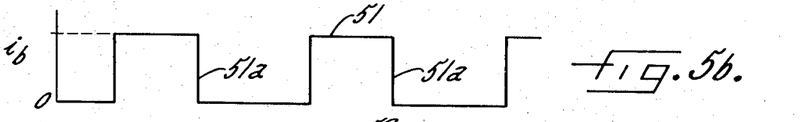
Figure 5C:
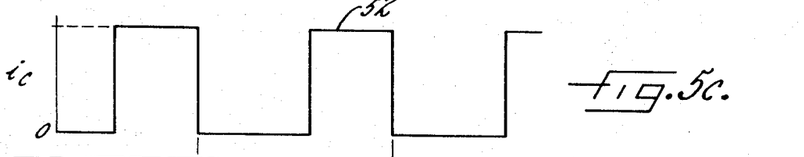

Referring now to FIGS. 5a, 5b and 5c, the waveforms 50, 51 and 52 illustrate the idealized manner in which the control current I, power transistor base current $i_b$ and power transistor collector current $i_c$ vary as square waves with time in response to the control signal 15. From the preceding description of FIG. 3, it will be understood that the amplitude of the waveforms 50, 51, 52 changes as the effective impedance of the motor 10 varies, so that the controllable impedance 34 is adjusted to keep $i_b$ just sufficient to operate the transistor P1 in a saturated mode with its voltage drop $e_p$ substantially at the minimum possible value when collector current is flowing. Of course, the duty cycle of the waveforms 50–52 changes in response to variations of the duty cycle of the control signal 15. The $i_c$ waveform 52 in FIG. 5c is shown without the slight distortions which may occur due to the inductance of the motor armature, such distortions being negligible for purposes of the present discussion.

Figure 5D:
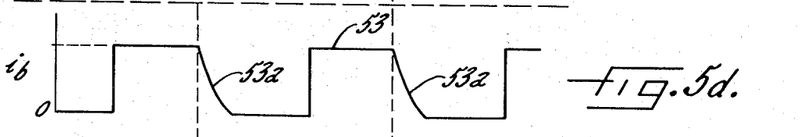
Figure 5E:
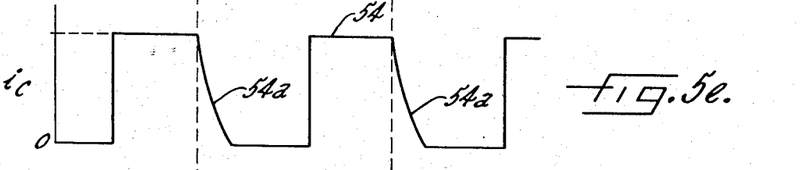

In the idealized and desirable operation, and as shown by FIG. 5c, the transistor P1 is alternately switched between full on and full off states, so that either zero collector current or a saturated value of collector current flows. It has been found, however, that although the impedance 34 is switched by the control current I (waveform 50) abruptly between an extremely high (theoretically infinite) value and a lower finite value (which varies inversely according to the voltage drop $e_p$), the power transistor is not abruptly turned off when the base current $i_b$ is theoretically turned off at 51a in FIG. 5b. Instead, the transistor P1 behaves as if the base current $i_b$ rather slowly decays as illustrated (to an exaggerated degree) at 53a in the waveform 53 for base current shown in FIG. 5d. This phenomenon is known to those skilled in the art and results from the fact that when the transistor P1 is turned on, an accumulation of charge carriers exits on the opposite sides of the emitter-base junction, so that even after the base current $i_b$ is interrupted, the charge carriers discharge and dissipate over a finite time interval. The emitter-collector path of the transistor P1 thus behaves as if a decreasing base current continued to flow for a short time, as illustrated at 53a. Accordingly, the transistor emitter-collector path is not abruptly switched to a off condition; on the contrary, the collector current decays over a finite time period after each theoretical turnoff instant, as shown (to an exaggerated degree) at 54a in curve 54 (FIG. 5d).

During the times that the collector current $i_c$ is decaying (as represented at 54a), the transistor P1 no longer operates in a saturated mode, but instead the emitter-collector path varies inversely in resistance according to the apparent decreasing base current represented at 53a. Thus, because the transistor P1 operates in a proportional mode, the voltage drop $e_p$ increases while the current $i_c$ slowly decreases from a high, saturated value to zero. The instantaneous product $i_c \cdot e_p$ during these short times represents watts of power consumed in the transistor P1—and even such short periods of nonsaturated operation recurring at a rapid rate may, as an average, take a considerable amount of energy from the battery 14 while contributing no useful work in the motor 10. Moreover, such power consumption in the transistor P1 raises its temperature and may possibly damage the transistor unless a bulky and expensive heat sink is associated therewith to remove heat at a high rate.

In accordance with another feature of the invention, power loss in the transistor P1 is further reduced and the latter is switched more abruptly from its saturated to its off state. For this purpose, another controllable impedance in the form of a shunt 56 (FIG. 1) is connected in parallel with or across the emitter-base path of the power transistor P1, and that shunt is controlled to present either an extremely high or an extremely low impedance value in timed synchronism with the operation of the control means which supply or interrupt the base current $i_b$ in the emitter-base path. As shown in FIG. 1, the control signal 15 is passed through an inverter 29 to create the complemental signal 27 fed as a controlling input to the shunt impedance. When the control signal 15 is "on" and the complemental signal 27 is "off" the shunt impedance is very high (theoretically infinite) so it does not affect the operation of the transistor P1 then conducting in a saturated mode. On the other hand, at each instant when the control signal 15 reverts to an "off" value, the complemental signal 27 changes to an "on" value and reduces the shunt impedance to a very low value. When this occurs, the accumulated charge carriers in the emitter-base junction of the transistor P1 quickly discharge or dissipate by current flow through the shunt impedance 56. The transistor P1 is thus more quickly turned off.

The shunt impedance 56 may comprise a switching device shown as a NPN transistor Q7 (FIG. 3) having its collector-emitter path connected in parallel with the emitter-base path of the power transistor P1. In order to render the switching device conductive or nonconductive (i.e., the impedance of the collector-emitter path in transistor Q7 low or high) in response to the control signal 15 having "off" or "on" values, respectively, the conductor 28 receiving the complemental control signal 27 from the multivibrator 16 is connected to the base of transistor Q7. Thus, when the transistor P1 is switched on or off in response to the control signal 15 (as previously explained), the shunt transistor Q7 is switched to nonconductive or conductive states. At the instant the transistor Q7 is made conductive, charge carriers in the emitter-base junction of transistor P1 are discharged quickly by current flow (shown at D in FIG. 3) through the low impedance of the collector-emitter path in Q7.

Figure 5F:
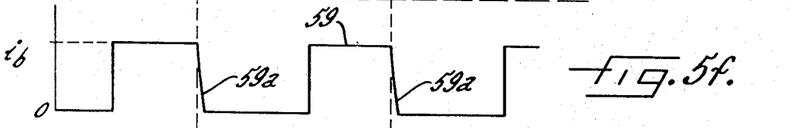
Figure 5G:
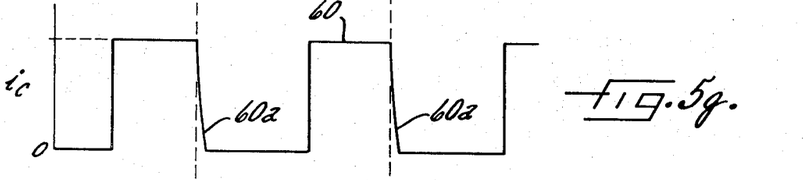

In result, the relatively slow apparent decay of base current $i_b$ represented at 53a in FIG. 5d is changed to a much faster and almost abrupt decay represented in 59a in FIG. 5f, wherein the waveform 59 illustrates the apparent base current $i_b$ with the controlled impedance 56 operative. Correspondingly, the collector current $i_c$ switches from a saturation value as shown at 60a in the waveform 60 of FIG. 5g. It will be apparent from comparison of the decay rate and times illustrated at 54a and 60a that the controlled shunt impedance serves to make the transistor P1 turn off more quickly, and thus to reduce significantly the power wasted in the form of heat within the transistor P1 each time the transistor is turned off. Since the transistor is turned on and off rapidly, this reduction in wasted power leaves more of the energy from battery 14 for useful work in the motor 10, and also lessens the likelihood that the transistor will be damaged by excessive temperatures.

Figure 4:
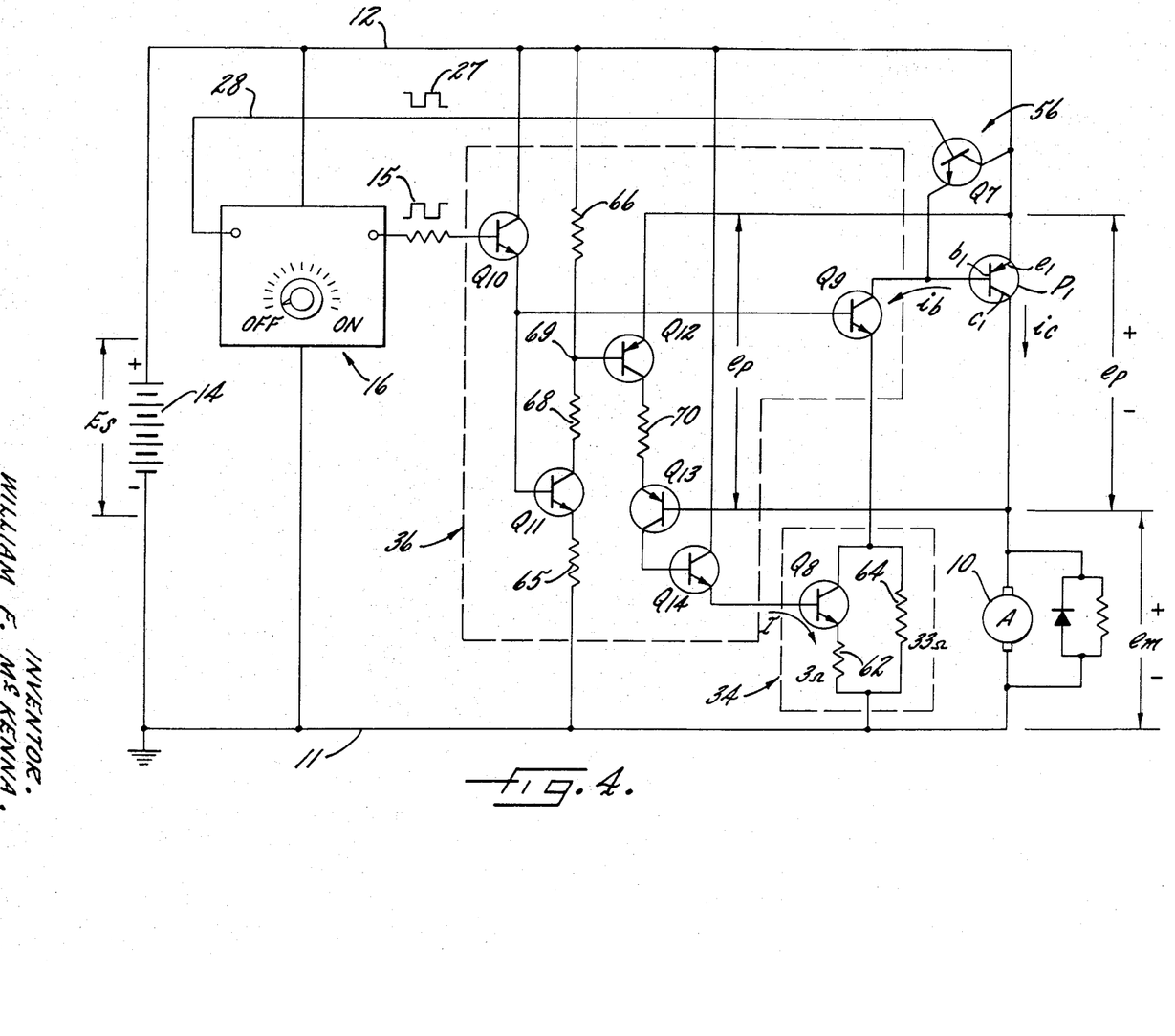
FIG. 4 is a schematic diagram similar to FIG. 3 but illustrating a second embodiment.

Turning now to FIG. 4, the second embodiment of the invention there shown functions to achieve the same advantageous operation described in connection with FIG. 3. Because of the general similarities in the apparatus, like components in FIG. 4 will be identified by the same reference characters employed in FIG. 3, and only the differences in the two embodiments will be described.

In FIG. 4, the controllable impedance 34 is formed by a transistor Q8 having its collector-emitter path connected in series (through a transistor Q9) with the emitter-base path of the power transistor P1. A relatively small 3 ohm resistor 62 is connected in series with the emitter of transistors Q8, and a larger resistor 64 having a value of about 33 ohms is connected in parallel across that series combination. Thus, as base-emitter current in transistor Q8 is increased, impedance of transistor Q8 decreases, and the equivalent resistance of the parallel combination decreases. Assuming that the transistor Q9 is turned on and conductive, therefore, variations in the control current I will inverse changes in the value of the controllable impedance 34, resulting in corresponding changes in the base current $i_b$ passed through the power transistor P1.

The gate 36 is shown in FIG. 4 as including the transistor Q9 in series with the controllable impedance 34. The control signal 15 is supplied to the base of a transistor Q10 having its emitter connected through the base-emitter path of a transistor Q11 and a resistor 65 to the negative bus 11. The collector of transistor Q10 is connected to the positive bus 12. Accordingly, when the control voltage 15 has "on" or "off" values which are relatively high or low potentials, the transistor Q10 is turned on or off and collector-emitter current flowing therethrough may pass through the base-emitter path of the transistor Q11, turning the latter on or off. Also, when transistor Q10 is turned on, collector-emitter current passed therethrough may flow through the base-emitter junction of transistor Q9 and the controllable impedance 34, such current always being sufficient to turn transistor Q9 fully on even when the controllable impedance 34 has its maximum value. In this way, the transistor Q9 switches the power transistor base current $i_b$ to zero (even though the value of the impedance 34 is then no greater than 33 ohms) whenever the control signal 15 is "off," but it permits the base current $i_b$ to flow, and to be determined in magnitude by the controllable impedance 34, whenever the control signal 15 is "on." Thus, the power transistor P1 is turned alternately on and off to apply pulses of voltage from the battery 14 to the armature of the motor 10. As the control signal source 16 is adjusted to vary the duty cycle of the control signal 15, the average value of the voltage and current pulses applied to the motor 10 is changed, and the speed of the motor may thus be adjusted.

The gate 36 further includes means to make the control current I (which governs the controllable impedance 34) vary directly according to changes in the voltage drop $e_p$ across the transistor P1. As here shown, the transistor Q11 has its collector connected through resistors 66 and 68 to the positive bus 12. As noted above, when the control signal 15 is "on" or "off," the transistor Q11 is turned on or off, thereby making the junction 69 between the resistors 66 and 68 switch between relatively low and relatively high potential values. The junction 69 is connected to the base of a transistor Q12 having its emitter connected to the positive bus 12 (but for clarity shown as connected to the electrically identical point at the emitter of transistor P1) and its collector connected through a resistor 70 to the emitter of a transistor Q13. The base of the transistor Q13 is connected to the collector of the power transistor P1. It will be apparent that the emitter-collector voltage drop $e_p$ is supplied to the gate 36 and appears across the series combination constituted by the emitter-collector path of the transistor Q12, the resistor 70 and the emitter-base path of the transistor Q13. Therefore, when the control signal 15 has its "on" value, the transistor Q12 is rendered fully conductive, and emitter-base current flows through the transistor Q13 but varies or takes on a magnitude proportional to the voltage drop $e_p$. In consequence, the transistor Q13 operating in a proportional mode presents an emitter-collector resistance which is inversely proportional to the voltage drop $e_p$, and collector current from the transistor Q13 which varies directly according to the voltage drop $e_p$ is passed from the positive bus 12 through the transistor Q12, through the emitter-collector path of the transistor Q13, and through the base-emitter path of a transistor Q14. The latter transistor has its collector connected to the positive bus 12, and its emitter connected to the base of the transistor Q8. Accordingly, the collector-emitter current passed by the transistor Q14—and which constitutes the control current I— varies directly with changes in the voltage drop $e_p$.

The control apparatus of FIG. 4 thus operates in a manner substantially like that described above for the apparatus of FIG. 3. In FIG. 4, when the effective impedance of the motor 10 is low, and if the base current $i_b$ is insufficient to saturate the transistor P1, then the voltage drop $e_p$ will increase substantially above the nominal saturated value of 0.3 volts. This increase in the voltage $e_p$ (during intervals when the transistor P1 is conductive) will increase the base-emitter current through the transistor Q13 which in turn increases the base-emitter current through the transistor Q14, thereby increasing the control current I, causing the impedance of the transistor Q8 to decrease.

The controllable impedance 34 will therefore decrease in value so that the base current $i_b$ increases sufficiently to drive the transistor P1 substantially into current saturation.

As the effective impedance of the motor 10 increases, however, and thus the voltage drop $e_p$ tends slightly to decrease, the control current I will decrease and the value of the impedance 34 will increase, thereby reducing the base current $i_b$ to a value which is substantially lower than before but just sufficient to maintain the transistor P1 substantially in a saturated state. Accordingly, the base current $i_b$ is never greater than it needs to be, and power is not needlessly consumed in providing the necessary base current. Yet, the speed of the motor 10 may be readily controlled by adjustment of the source 16 to vary the duty cycle of the control signal 15, because the transistor Q9 totally interrupts the flow of base current $i_b$ during those intervals when the control signal has its "off" value.

Finally, the controllable shunt impedance 56 shown in FIG. 4 is constituted by the transistor Q7 and operates in the same way as described above with reference to FIG. 3.

Although specific embodiments of the present invention have been shown by way of example in FIGS. 3 and 4 as employing various NPN or PNP transistors connected in a particular way, it will be understood by those skilled in the art that any transistor may be replaced by one of the opposite type with appropriate and routine modifications in the wiring connections. Accordingly, it is intended here that the appended claims embrace control apparatus employing transistors of either the NPN or PNP type.

In summary, the invention here described brings to the art a system for energizing a variable impedance load, such as a motor, from a voltage source in the form of a rechargeable battery while controlling the average energization and speed of the motor load. Useless dissipation of energy drawn from the voltage source is reduced or minimized by automatically causing the base current of a final power transistor to be reduced as the effective impedance of the load increases, while nevertheless permitting a sufficient base current to be established when the effective load impedance is low so that very high load-energizing currents (necessary for starting the motor) can be obtained. Further, energy losses in the final power transistor P1 are also reduced by controlling the latter so that it operates alternately in a fully off or fully saturated mode, and the transistor is quickly switched to cutoff by the controlled shunt impedance here described, further reducing useless power loss in and heating of the transistor.

I claim as my invention

1. In a system for energizing a variable impedance load from a voltage source, the combination comprising
    a power transistor having an emitter, base and collector with its emitter-collector path connected in series with said load across said voltage source,
    a controllable impedance in series with the emitter-base path of said transistor across said voltage source to draw emitter-base current and thereby render the emitter-collector path of said transistor conductive,
    and means responsive to changes in the voltage drop between said emitter and collector for causing an inverse change in the value of said controllable impedance.

2. In a system for energizing a DC motor with current from a voltage source, the combination comprising
    a power transistor having an emitter, base and collector with its emitter-collector path connected in series with said motor across said voltage source,
    a control transistor having an emitter, base and collector with its emitter-collector path connected in series with the emitter-base path of said power transistor across said voltage source,
    and means for supplying current, which varies according to the variations of the voltage drop across the emitter-collector path of said power transistor, through the emitter-base path of said control transistor,
    whereby the emitter-base current through said power transistor is increased or decreased in response to decreases or increases in the effective impedance of said motor and said power transistor is maintained substantially in a state of saturated conduction with substantially the least amount of emitter-base current through the power transistor as the effective impedance of the motor changes.

3. The combination set forth in claim 2 further characterized in that said means for supplying current includes a third transistor having an emitter, base and collector,
    means connecting the emitter-base path of said third transistor across the emitter-collector path of said power transistor,
    and means connecting the emitter-collector path of said third transistor in series with the emitter-base path of said control transistor across said voltage source,
    whereby the emitter-collector impedance of said control transistor varies according to the current through the emitter-collector path of said third transistor and varies according to changes in the emitter-collector voltage drop of the power transistor.

4. In a system for controlling the average current drawn from a voltage source through a variable impedance load, the combination comprising
    a power transistor having an emitter, base and collector with its emitter-collector path connected in series and said load across said voltage source,
    a controllable impedance connected in series with the emitter-base path of said transistor across said source to draw emitter-base current and thereby render the emitter-collector path of said transistor conductive to energize said load,
    means for producing a recurring control signal having successive "on" and "off" values adjustable in their respective time durations,
    means responsive to said control signal having an "off" value for causing said controllable impedance to have a predetermined high value, and
    means responsive to said control signal having an "on" value for causing said controllable impedance to have a value which varies inversely according to the value of the voltage drop across the emitter-collector path of said transistor,
    whereby the on-off duty cycle of energization of said load is adjustable to vary the average voltage applied to the load, and during the "on" intervals the emitter-base current through said transistor varies in an inverse fashion with changes in the effective impedance of the load.

5. In a system for controlling the average current supplied from a voltage source to energize a variable impedance load, the combination comprising a power transistor having an emitter, base and collector with its emitter-collector path connected in series with said load across said voltage source,
   a controllable impedance in series with the emitter-base path of said transistor across said voltage source to draw emitter-base current and thereby render the emitter-collector path of said transistor conductive,
   means for producing a recurring square wave control voltage adjustable in the ratio of the duration of its "on" to "off" values,
   means responsive to said control voltage for causing said controllable impedance to have a predetermined high value during those time intervals when the control voltage has its "off" value,
   and means responsive to said control voltage and to the voltage drop across the emitter-collector path of said transistor for causing said controllable impedance to vary according to changes in the last-named voltage drop during those time intervals when said control voltage has its "on" value,
   whereby said load is energized by successive pulses of current through the emitter-collector path of said transistor to vary the average energization current, and during each pulse of current the emitter-base current through said transistor is generally inversely proportional to the impedance presented by said load.

6. In a system for controlling the current excitation of a DC motor from a DC voltage source, the combination comprising
   a power transistor having an emitter, base and collector with its emitter-collector path connected in series with said motor across said voltage source,
   a control transistor having an emitter, base and collector; means connecting the emitter-collector path of said control transistor in series with the emitter-base path of said power transistor across said voltage source;
   means for producing a recurring square wave signal including means to adjust the ratio of the durations of the "on" and "off" values of such signal; and
   means responsive to said control signal for (a) substantially interrupting current through the emitter-base path of said control transistor when the control signal has its "off" value, and (b) supplying current, which in magnitude is generally proportional to the voltage drop across the emitter-collector junction of said power transistor, through the emitter-base path of said control transistor when the control signal has its "on" value.

7. In a system for controlling the current excitation of a DC motor from a DC voltage source, the combination comprising
   a power transistor having an emitter, base and collector with its emitter-collector path connected in series with said motor across said voltage source,
   a control transistor having an emitter, base and collector, first means connecting the emitter-collector path of said control transistor in series with the emitter-base path of said power transistor across said voltage source,
   a third transistor having an emitter, base and collector, second means connecting the emitter-collector path of said third transistor in series with the emitter-base path of said control transistor across said voltage source,
   third means connecting the emitter-base path of said third transistor across the emitter-collector path of said power transistor,
   said second means including a switching device adapted to be turned on or off to complete or interrupt the series connection, a free-running multivibrator having means to adjust the ratio of the durations of the "on" and "off" periods of its output signal,
   and means coupling said output signal to said switching device to turn the latter on or off respectively during the "on" and "off" periods of such output signal.

8. In a system for turning a transistor on and off to supply or terminate current from a voltage source through a load, the combination comprising
   a transistor having a emitter, base and collector with its emitter-collector path connected in series with said load across said voltage source,
   first means for supplying or interrupting current through the emitter-base path of said transistor to render the emitter-collector path respectively conductive or nonconductive,
   a controllable impedance device connected in shunt across the emitter-base path of said transistor,
   and means for making the impedance of said device high or low in timed synchronism with the operation of said first means respectively supplying or interrupting current through the emitter-base path of said transistor.

9. In a system for supplying current pulses from a voltage source through a load, the combination comprising a power transistor having an emitter, base and collector with its emitter-collector path connected in series with said load across said voltage source,
   means for generating a recurring square wave signal having alternate "on" and "off" values,
   means responsive to said signal having an "on" or "off" value for respectively supplying or terminating current flow through the emitter-base junction of said power transistor to render the emitter-collector path respectively conductive or nonconductive,
   a controllable switching device connected across the emitter-base path of said transistor,
   and means responsive to said signal having an "on" or "off" value for respectively rendering said switching device nonconductive or conductive, whereby said switching device forms a shunt for discharge of accumulated charge carriers in the emitter-base path of said transistor whenever said signal reverts to its "off" value so that the emitter-collector path of said transistor is more quickly placed in its nonconductive state.

10. In a system for supplying pulses from a voltage source through a load, the combination comprising
    a power transistor having an emitter, base and collector with its emitter-collector path connected in series with said load across said voltage source,
    a free-running multivibrator producing a first output signal having alternately first and second values and producing a second output signal complemental to the first and having alternately second and first values, means responsive to said first signal for respectively supplying or interrupting current through the emitter-base path of said power transistor when such signal has its first or second values to render the emitter-collector path of said power transistor respectively conductive or nonconductive,
    a shunt transistor having an emitter, base and collector with its emitter-collector path connected in parallel with the emitter-base path of said power transistor, and
    means responsive to said second signal for respectively supplying or interrupting current through the emitter-base path of said shunt transistor when the second signal has its first or second values to render the emitter-collector path of said shunt transistor respectively conductive or nonconductive,
    whereby accumulated charge carriers in the emitter-base junction of said power transistor are quickly discharged through said shunt transistor each time the power transistor is turned off.

11. The combination set forth in claim 10, further characterized in that said multivibrator includes means for adjusting the ratios of the durations of the first and second values of the two output signals.

12. In a system for applying energizing pulses to a variable impedance load from a voltage source, the combination comprising
    a transistor having an emitter, base and collector with its emitter-collector path connected in series with said load across said voltage source, a controllable impedance in series with the emitter-base path of said transistor across said voltage source to draw emitter-base current and thereby render the emitter-collector path of said transistor conductive, means for making said controllable impedance very high during first time periods and relatively low during second time periods, whereby voltage pulses and applied to said load during the second time periods, means responsive to changes in the voltage drop between said emitter and collector for causing an inverse change in the relatively low value of said controllable impedance during said second time periods, a controllable switching device connected across the emitter-base path of said transistor, and means for rendering said switching device conductive or nonconductive respectively during said first or second time periods.

13. In a system for energizing a variable impedance load with current pulses from a voltage source, the combination comprising a power transistor having an emitter, base and collector with its emitter-collector path connected in series with said load across said voltage source, a first controllable impedance connected in series with the emitter-base path of said transistor across said voltage source to draw emitter base current and thereby render the emitter-collector path of said transistor conductive to energize said load, means for causing said first controllable impedance during alternate ones of successive time intervals to have relatively high and low range values to respectively render said power transistor cut off and conductive, means for varying the value of said first controllable impedance in the same sense as and according to changes in the value of the load impedance during those intervals when the controllable impedance has low range values, a second controllable impedance connected in shunt across the emitter-base path of said power transistor, and mans for causing said second impedance to have relatively low and high range values during those time intervals in which the first impedance respectively has high and low range values.

14. In a system for energizing a DC motor with current from a voltage source, the combination comprising a power transistor having an emitter, base and collector with its emitter-collector path connected in series with said motor across said voltage source, means for generating a recurring square wave signal having alternate "on" and "off" values, a control transistor having an emitter, base and collector with its emitter-collector path connected in series with the emitter-base path of said power transistor across said voltage source, means responsive to said signal for rendering said control transistor nonconductive when said signal has "off" values, means responsive to said control signal when it has "on" values for supplying current, which varies according to the variations of the voltage drop across the emitter-collector path of said power transistor, through the emitter-base path of said control transistor, a further transistor having an emitter, base and collector with its collector-emitter path connected in parallel across the emitter-base path of said power transistor, and means for rendering said further transistor conductive or nonconductive during those times when said signal respectively has "off" or "on" values.

15. In a system for controlling the average current drawn from a voltage source through a variable impedance load, the combination comprising a power transistor having an emitter, base and collector with its emitter-collector path connected in series with said load across said voltage source, a first controllable impedance connected in series with the emitter base path of said transistor to draw emitter-base current and thereby render the emitter-collector path of said transistor conductive to energize said load, means for producing a recurring control signal having successive "on" and "off" values adjustable in their respective time durations, means responsive to said control signal having an "off" value for causing said first impedance to have a predetermined high value, means responsive to said control signal having an "on" value for causing said first impedance to have a value which varies inversely according to the value of the voltage drop across the emitter-collector path of said transistor, a second controllable impedance connected across the emitter-base path of said transistor, and means responsive to said control signal for making said second impedance have a high or a low value whenever said signal respectively has its "on" or "off" values.

16. In a system for controlling the current excitation of a DC motor from a DC voltage source, the combination comprising a power transistor having an emitter, base and collector with its emitter-collector path connected in series with said motor across said voltage source;

a control transistor having an emitter, base and collector;

means connecting the emitter-collector path of said control transistor in series with the emitter-base path of said power transistor across said voltage source;

means for producing a recurring square wave signal including means to adjust the ratio of the durations of the "on" and "off" values of such signal;

means responsive to said control signal for (a) substantially interrupting current through the emitter-base path of said control transistor when the control signal has its "off" value, and (b) supplying current, which in magnitude is generally proportional to the voltage drop across the emitter-collector junction of said power transistor, through the emitter-base path of said control transistor when the control signal has its "on" value;

a further transistor having an emitter, base and collector with its emitter-collector path connected across the collector-base path of said power transistor; and means responsive to said control signal for (a) supplying current to the base-emitter path of said further transistor when said control signal has its "off" value to thereby enable the emitter-collector path of the further transistor for saturated conduction, and (b) terminating current through the base-emitter path of said further transistor when said control signal has its "on" value to render the emitter-collector path of said further transistor nonconductive.

\* \* \* \* \*